H. S. STUDDERT.
PISTON PACKING.
APPLICATION FILED MAY 2, 1910.
976,007.
Patented Nov. 15, 1910.
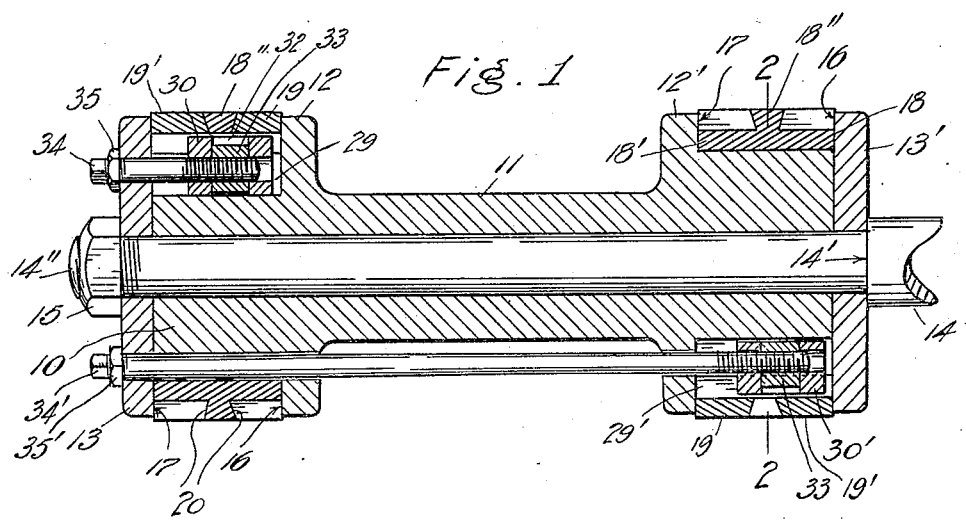
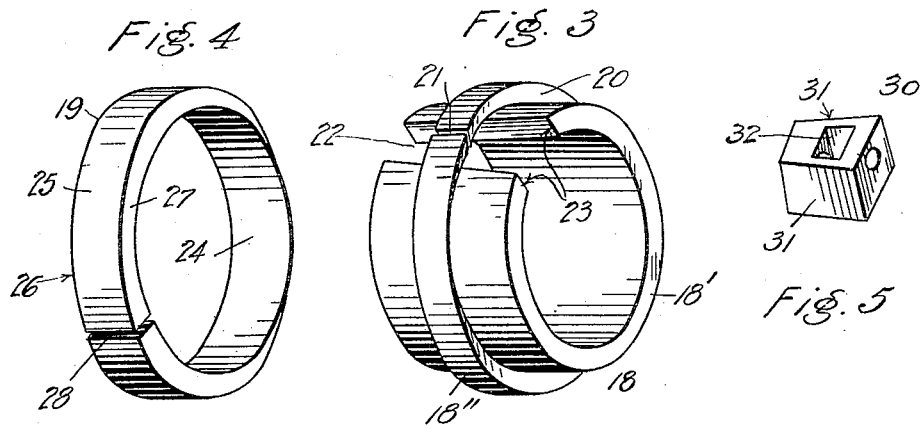
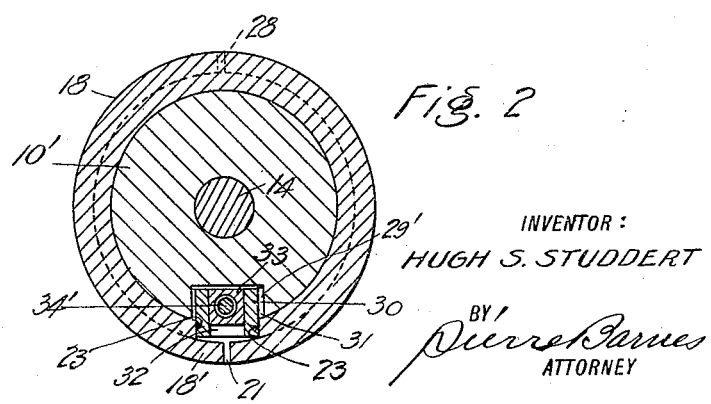
WITNESSES:
H. Barnes
E. Peterson
INVENTOR:
HUGH S. STUDDERT
BY Pierre Barnes
ATTORNEY

UNITED STATES PATENT OFFICE.

HUGH S. STUDDERT, OF SEATTLE, WASHINGTON.

PISTON-PACKING.

976,007. Specification of Letters Patent. Patented Nov. 15, 1910.

Application filed May 2, 1910. Serial No. 558,824.

*To all whom it may concern:*

Be it known that I, HUGH S. STUDDERT, a citizen of the United States, residing at Seattle, in the county of King and State of Washington, have invented certain new and useful Improvements in Piston-Packings, of which the following is a specification.

This invention relates to piston-packing, and while especially designed for use with piston-valves, it may advantageously be utilized with other pistons employing expansible packing rings.

The object of my invention is the improvement in packing rings and the provision of efficient and conveniently operable devices whereby the same may be adjusted without removal of the piston from the containing cylinder.

The invention consists in the novel construction and combination of parts as will be hereinafter described and claimed.

In the accompanying drawings Figure 1 is a view in longitudinal section of a piston-valve with my invention applied thereto. Fig. 2 is a cross sectional view taken through 2—2 of Fig. 1. Figs. 3 and 4 are perspective views of the packing rings. Fig. 5 is a perspective view of a wedge-block employed in expanding the packing-rings.

The piston illustrated in Fig. 1 is formed with two cylindrical end portions 10 and 10', a central portion 11, and collars 12 and 12' intermediate the respective end portions and the central portion. Followers 13 and 13' are provided for the piston ends and may be rigidly secured thereto in any suitable manner as by interposing follower 13 between a shoulder 14' of the valve stem 14 and the piston; and securing the other, 13', by a nut 15 screwed upon the projecting end 14'' of the stem which is here shown as extended through the piston and followers. The outer faces 17 of the collars and the opposing faces 16 of the followers are in planes at right angles to the piston axis. Between each of said collars and the adjacent follower is an annular recess for the reception of the packing rings. There are three packing rings 18, 19 and 19' in each such recess. A ring 18 is formed with a web portion 18' of a width equal to the distance between the faces 16 and 17 of a recess and of an internal diameter equal to or slightly greater than the diameter of the piston part 10, or 10', and of a thickness less than the depth of the recess. At the midwidth of the ring-web 18' it is provided with a circumferential ridge 18'' whose side faces 20 are under cut as best shown in Fig. 1. Said ridge is cut transversely, as at 21, and in the web 18' is an opening 22, Fig. 3, with ends 23 disposed in planes which diverge from the head end of the piston. The rings 19 and 19' are similarly formed by having their inner and outer peripheries 24 and 25 concentric and respectively corresponding to diameters of the outer peripheries of the web 18' and the ridge 18'' of the ring 18 with which associated. In cross section, the rings 19 and 19' are formed with outer ends 26 in planes at right angles to the axes thereof, while the opposite ends 27 are conoidal to interfit with the faces 20 of the ridge 18'' when the rings 19 and 19' are operatively positioned in the spaces at the opposite sides of the latter. The rings 19 and 19' are also cut as at 28. Within the piston ends 10 and 10' are chambers 29 and 29' whose sides may be parallel.

30 and 30' represent wedge-blocks having sloping sides 31 of the same inclination as that of the ends 23 of the ring webs 18' and are positioned between such ends and also extend into the aforesaid chambers 29 and 29'. As illustrated, said blocks are each provided with a cavity 32 to accommodate a nut 33 for engagement with adjustment screw-bolts 34, or 34', which extend through apertures in the blocks, the piston, and the follower 13 at the head end of the piston. 35 and 35' are nuts upon said bolts and engaging against the follower 13 for securing the bolts subsequent to the adjustment of the connected wedge-blocks. Instead of employing nuts 33 for the connection between a wedge-block and its adjusting screw-bolt, the block may be tapped to itself fulfil the office of the nut; but the nuts having proved the more satisfactory they are preferred by me.

In operating, a wedge-block is caused to be advanced by rotating the screw-bolts therefor more or less toward the head end of the piston to effect the expansion of the ring 18 required to compensate for the cylinder wear. The rings 19 and 19' being seated upon the web 18' of the master-ring, so to speak, and in the expansion of the latter, are correspondingly expanded. It is to be noted that the ridge 18'' of the ring 18 being, as previously mentioned, undercut, constrains the outward movements of the rings 19 and 19'.

The invention is extremely simple in construction and affords a good packing which may be adjusted without removing the piston from the cylinder, and, as exemplified by the group of packing-rings to the right hand side of Fig. 1, the rings may be set at a distance from the end of a piston wherefrom the adjustment is accomplished.

What I claim as my invention, is—

1. A piston-packing, comprising a master-ring provided with a peripherally disposed ridge, a second ring seated upon the aforesaid ring and engaged by the ridge thereof, and an adjustable wedge operating in conjunction with the master-ring for expanding both of said rings.

2. In a piston-packing, a ring, a second ring seated upon and interlocked with the first named ring, a wedge engaging the first named ring, a nut housed within said wedge, and a screw engaging said nut and operable to effect the expansion of both of said rings.

3. In a piston, a packing ring formed with a circular web and a centrally disposed ridge extending circumferentially thereabout and having its opposite sides undercut, a pair of rings seated upon said web at opposite sides of the ridge and having their edges interfit therewith, in combination with a wedge extending through a gap provided in said web, and means extending longitudinally of the piston for advancing the wedge to cause the expansion of all of said rings simultaneously.

4. A piston-packing comprised of a ring formed with a web and a ridge extending circumferentially of the web and intermediate of its width, said ridge being cut transversely and the web being cut away to a distance from each side of the ridge cut, two rings fitted to seat upon the web of the aforesaid ring and severally provided with a transverse cut, a wedge located in the cutaway portion of said web, and means to impart movement to said wedge to effect the expansion of the rings.

5. The combination with a piston provided with an annular recess, a packing ring extending across the recess and with a portion cut away to afford an opening in the ring, a second ring seated upon the aforesaid ring, a wedge-block seated in a recess of the piston and extending into said opening of the first named ring, a screw extending longitudinally through the piston and operatively connected with said wedge-block whereby the rotation of the screw will advance the wedge longitudinally with respect to the piston to adjustably expand both of said rings.

6. A piston packing comprising a master-ring, a second ring seated upon said master-ring, a wedge extending through a gap provided in the master-ring, and means for advancing or retracting said wedge to control the expansion of said master-ring and also the expansion of said second ring.

7. A piston packing comprising a master-ring, a second ring seated upon and interlocked with said master-ring, a wedge engaging the master-ring, and a screw arranged to control the movements of said wedge to effect the expansion of the two rings.

8. A piston-packing comprising a master-ring formed with a web and a ridge extending circumferentially thereabout, said ridge being cut transversely and a portion of the web cut away at a distance from each side of the web cut, a ring fitted against the web and the ridge of said master-ring and provided with a transverse cut, a wedge positioned in the gap afforded by the cut away portion of said web, and means to impart movement to the wedge for controlling the expansion of the rings.

HUGH S. STUDDERT.

Witnesses:
H. BARNES,
E. PETERSON.